United States Patent [19]

Berman et al.

[11] 4,001,036
[45] Jan. 4, 1977

[54] SYSTEM FOR IMPROVING CHARGE EFFICIENCY OF A ZINC-CHLORIDE BATTERY

[75] Inventors: Alby M. Berman, Oak Park; Richard C. Walker, Gaylord; David J. Aller, Royal Oak, all of Mich.

[73] Assignee: Energy Development Associates, Madison Heights, Mich.

[22] Filed: Nov. 20, 1975

[21] Appl. No.: 634,004

[52] U.S. Cl. .................................. 429/67; 429/70
[51] Int. Cl.² .................................. H01M 10/00
[58] Field of Search .......... 136/6 R, 6 E, 155, 162, 136/86 C

[56] References Cited

UNITED STATES PATENTS

| 3,793,077 | 2/1974 | Behling | 136/6 E |
| 3,935,024 | 1/1976 | Symons | 136/6 E |
| 3,940,283 | 2/1976 | Symons | 136/6 E |

*Primary Examiner*—John H. Mack
*Assistant Examiner*—C. F. Lefevour
*Attorney, Agent, or Firm*—Ostrolenk, Faber, Gerb & Soffen

[57] ABSTRACT

A system is provided for improving the charge efficiency of a zinc-chloride battery by reducing the chlorine concentration on charge in a flowing electrolyte system by desorbing chlorine from the flowing electrolyte under reduced pressure and removing the desorbed chlorine from the electrolyte flow loop.

8 Claims, 2 Drawing Figures

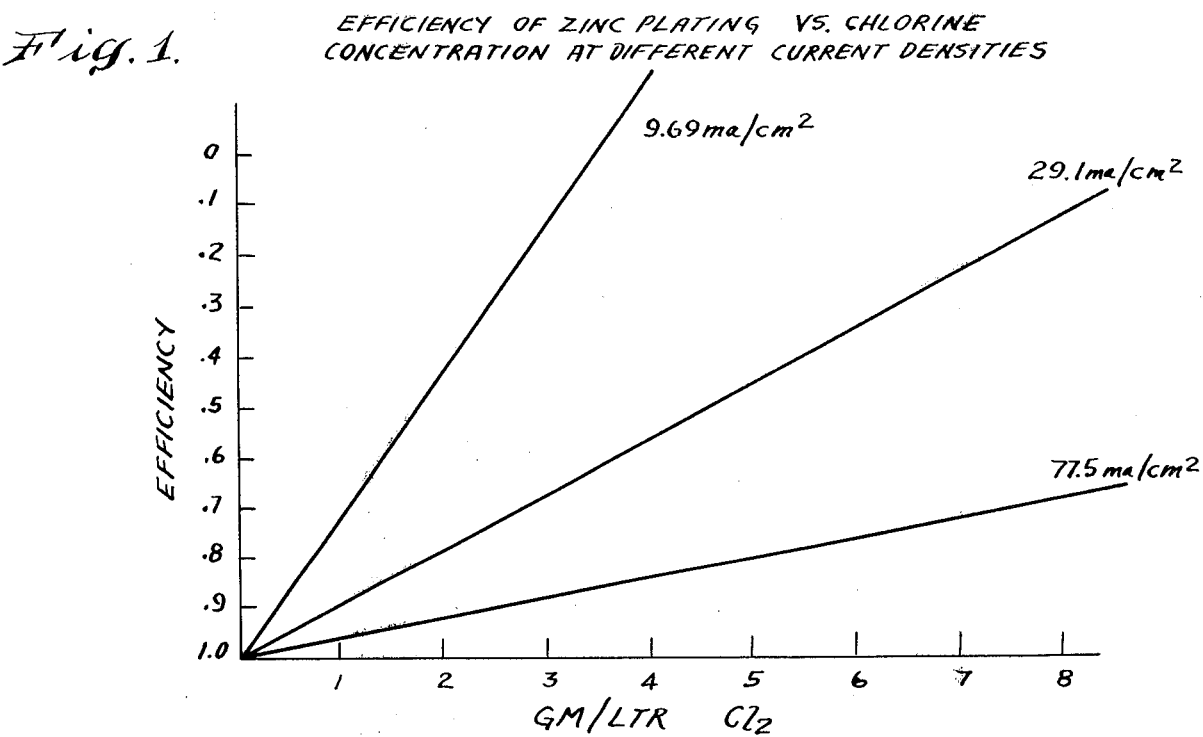
Fig. 1. EFFICIENCY OF ZINC PLATING VS. CHLORINE CONCENTRATION AT DIFFERENT CURRENT DENSITIES
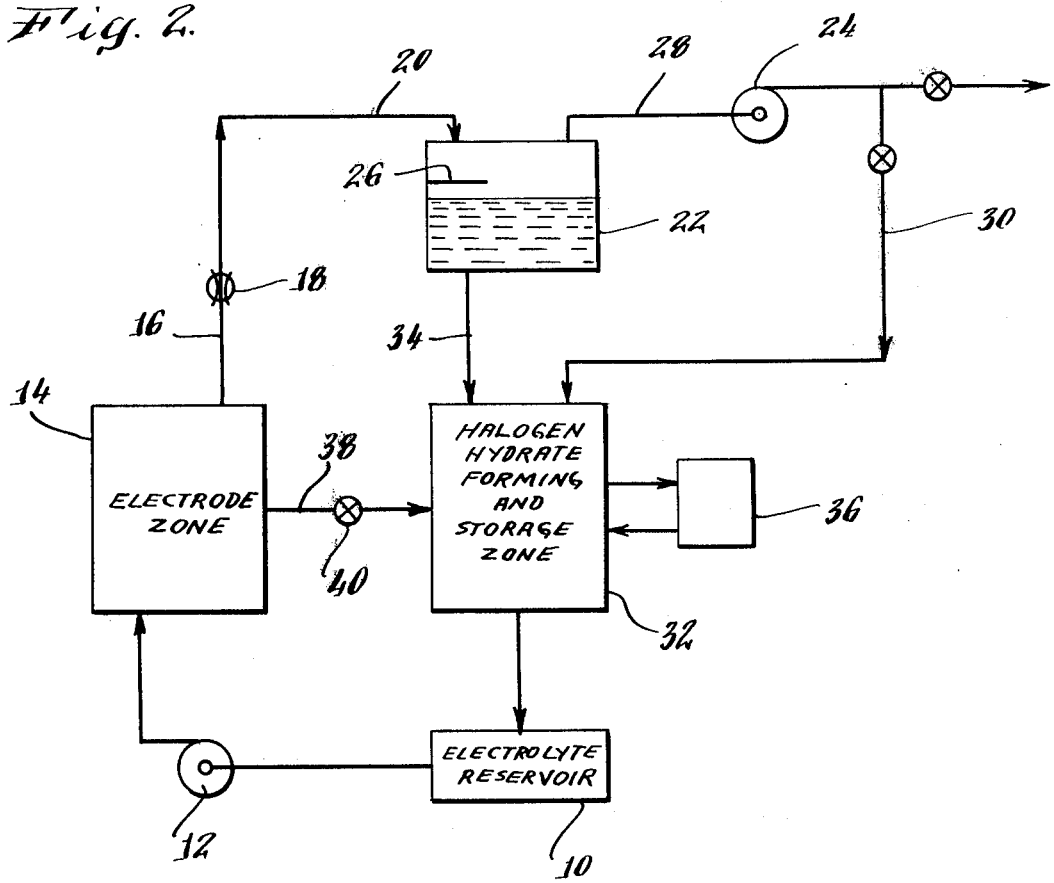
Fig. 2.

SYSTEM FOR IMPROVING CHARGE EFFICIENCY OF A ZINC-CHLORIDE BATTERY

DESCRIPTION OF THE PRIOR ART

Electrical energy storage systems or secondary batteries of the so-called high energy density (H.E.D.) type have assumed increasing importance in recent years because of their capability of supplying upwards of 50 watt hours of electrical power per pound of weight. The high energy capacity and compactness of such H.E.D. batteries renders them particularly satisfactory for use as principal or auxiliary sources of electrical energy in both mobile and stationary power plant systems. A metal/halogen/hydrate secondary storage battery of the foregoing type is described in detail in U.S. Pat. No. 3,713,888, issued Jan. 30, 1973, entitled "Process For Electrical Energy Using Solid Halogen Hydrate", which is assigned to the same assignee as the present invention. The specific teachings of said patent are incorporated herein by reference.

The background of the present invention and the invention itself will be more clearly understood and appreciated by reference to the drawing wherein:

FIG. 1 is a graphical representation of the relationship between efficiency of charge (zinc plating) with respect to the chlorine concentration at different current densities; and FIG. 2 is a schematic flow diagram illustrating the improved electrical energy storage system of the present invention.

During the charging of high energy density secondary batteries utilizing chlorine and a highly electropositive metal as electrodes and reactants, an aqueous metal chloride salt electrolyte is circulated through the battery cells, plating out the metal on an electrode base and generating chlorine at the other electrode. In cells wherein the electrodes are of zinc and chlorine (on a carbon base), an aqueous zinc chloride electrolyte passing through the cells carries with it chlorine produced during the charging operation.

It has been found that during the zinc deposition in such a zinc-chloride battery, a major cause of coulombic inefficiency is zinc loss from the zinc plate on the electrode base by reaction with the chlorine dissolved in the electrolyte solution. This corrosion rate has been found to be directly proportional to the dissolved chlorine concentration; hence, a reduction in dissolved chlorine level is advantageous from a coulombic efficiency standpoint. The adverse effects of chlorine on coulombic efficiency can be more fully appreciated upon reference to FIG. 1 which illustrates the relationship between efficiency of charge (zinc plating) with respect to the chlorine concentration at different current densities. It can readily be seen that coulombic efficiency undergoes a marked reduction with increasing chlorine concentration, especially with decreasing current density.

Efforts have heretofore been made to reduce or prevent contact of the dissolved chlorine with the metallic zinc plate. These efforts have entailed use of diaphragm cells employing thin membranes of electrolyte-pervious material positioned between the anode and cathode. However, physical difficulties of construction, sagging and breaking of the diaphragms with time, and changes in permeability during use often make them impractical from a commercial point of view. Other attempts have been made to obtain a diaphragmless secondary cell by altering the cell construction to cause a stream of electrolyte of reduced chlorine concentration to impinge upon the metal electrode. Although this method is effective, it nevertheless requires modification of the cell structure. Therefore, it would be highly desirable to provide a simple means for effecting a general reduction in the dissolved chlorine level in the battery system without significant and expensive modification of the battery system.

Accordingly it is an object of the present invention to provide an improved metal-halogen-hydrate battery system of improved charge efficiency.

It is another object of the present invention to provide means for reducing the corrosion rate of the zinc plate on charging in a zinc-chloride battery.

These as well as other objects are accomplished by the present invention which provides an improved electrical energy storage system comprising:

at least one cell having a relatively positive metal electrode and a relatively negative halogen electrode separated by an aqueous electrolyte containing ions of said metal and halogen, means for forming and storing a quantity of halogen hydrate, means for circulating said electrolyte through said cell and said means for forming and storing said halogen hydrate, throttling means for partially reducing the pressure on the circulating electrolyte while maintaining the pressure in the cell, thereby causing chlorine to be desorbed therefrom; and means for separating the desorbed chlorine from the electrolyte under reduced pressure.

DESCRIPTION OF THE PREFERRED EMBODIMENTS

Referring now to FIG. 2, electrolyte from electrolyte reservoir 10 is pumped via electrolyte pump 12 to electrode zone 14 containing at least one positive and one negative electrode. During charging, halogen gas forms at the positive electrode. Since the solution is flowing throughout the electrode area, the halogen formed therein will likewise be carried through the loop. The electrolyte solution carrying the entrained halogen passes via line 16 through throttling valve 18 wherein a pressure reduction is effected at the outlet side of the valve, resulting in partial desorption of the entrained chlorine from the solution. The electrolyte and partially desorbed chlorine pass via line 20 to a chlorine separation zone 22. If desired, the various zones which have been shown separately can be combined depending upon available space and other sizing requirements. Chlorine separation zone 22 is maintained under reduced pressure relative to the electrode zone 14 by vacuum pump 24. The combination of throttling valve 18 and vacuum pump 24 enables the electrode zone 14 to operate at atmospheric pressure or any convenient or desirable pressure while the chlorine separation zone operates under reduced pressure, e.g., about one-half atmosphere or less and preferably, about one-third atmosphere or less, thereby increasing desorption of the chlorine gas.

The throttling valve 18 can be any means for effecting a restriction to flow which creates a significant pressure drop upon passage therethrough, e.g., an orifice sized to effect the required pressure drop, a porous plug, a capillary tube, a needle valve and the like. Upon passage through the valve, the electrolyte containing dissolved chlorine is subjected to a reduced pressure relative to the electrode zone and, pursuant to Henry's Law, the dissolved gas comes out of solution. The resulting mixture passes into the chlorine separator 22 which is maintained under reduced pressure, e.g. 0.33 atmosphere, via vacuum pump 24. Under the reduced pressure in zone 22, further desorption occurs. Still further separation of the chlorine from the electrolyte can be obtained, if desired, by mechanical agitation of the electrolyte such as by contact with one or more protruding surfaces within the separation zone 22 such as plate 26, which also aids in separating the gas zone from a lower electrolyte zone. The desorbed gas can pass via line 28 through pump 24 wherein it is advantageously compressed and fed via line 30 to halogen hydrate forming and storage zone 32. The chlorine-depleted electrolyte is passed to halogen hydrate forming and storage zone 32 via line 34. Zone 32 is maintained under controlled conditions of temperature and pressure to cause formation and solidification of halogen hydrate from the halogen and water in the electrolyte. The temperature and pressure within zone 22 is maintained such that the electrolyte remains a liquid while the halogen hydrate forms as a solid thereby enabling ready separation of the halogen hydrate from the electrolyte by any suitable means such as filtration. The electrolyte solution, now depleted of both entrained halogen and the halogen hydrate formed and stored in zone 22 is now passed back to the electrolyte reservoir 10 thereby completing a closed loop.

Reference is made to U.S. Pat. No. 3,713,888 for a detailed discussion of suitable materials for use as the halogen electrode, the metal electrode and the electrolyte solution. Such discussion is incorporated herein by reference.

During the charging process in a secondary battery, the metal halide electrolyte solution is pumped through the electrode area whereby the metal will plate out onto the negative electrode and halogen will form at the positive electrode. During this metal plating process, a secondary reaction which simultaneously competes with the primary electrochemical reaction is the reaction of the zinc plate with the chlorine dissolved in solution, thereby resulting in zinc loss with attendant coulombic inefficiency. In the present invention, however, it has been found that by interposing the combination of a throttling valve 18 and chlorine separation zone 22 in the line between the electrode zone 14 and the hydrate forming and storing zone 22, a vapor-liquid separation can be advantageously effected without significantly interferring with the system. The desorbed halogen gas can be either stored, vented or passed via line 30 to the halogen hydrate forming zone as may be required. A typical halogen hydrate forming and storing zone such as can be satisfactorily employed in the present invention is described in U.S. Pat. No. 3,814,630 issued June 4, 1974 and assigned to the same assignee of the present invention. The disclosure of that patent is incorporated herein by reference. As shown in said patent, the halogen hydrate forming and storing zone is generally provided with a heat exchanger 36 for effecting an appropriate extraction or addition of heat to the electrolyte to form solid halogen-hydrate during the charging of the system. The thus formed halogen hydrate can then be stored in the storage compartment of the halogen hydrate forming zone. The electrolyte solution then continues back to the electrolyte reservoir 10.

In the manner described hereinabove, desorbed chlorine is substantially prevented from being reabsorbed in the electrolyte because of its removal in the chlorine separator, the net effect being a general reduction in dissolved halogen level in the battery system during charging and hence, a higher coulombic efficiency on charge than has heretofore been possible.

During discharge, the electrolyte passing through the halogen hydrate forming and storing zone 32 picks up halogen hydrate which dissolves into the electrolyte. The halogen is reduced at the positive electrode and the metal is oxidized at the negative electrode to produce useful electrical energy. Since on discharge, the electrolyte is deficient in halogen, it need not be processed for chlorine deficient in halogen, it need not be processed for chloringe separation; instead, it can be passed directly to the halogen hydrate forming and storage zone 32 via line 38. This can be easily effected by closing throttling valve 18 and opening valve 40 in line 38 thereby bypassing the vapor-separation operation effected in accordance with the present invention. The electrolyte will then be passed directly from the electrode zone 14 to the halogen hydrate forming and storage zone 32 and since the electrolyte is deficient in halogen, the electrolyte will dissolve more halogen hydrate. This will result in decomposition of the halogen hydrate in zone 32 whereby halogen and water will be formed thereby maintaining equilibrium. This process will continue during discharge until all halogen hydrate has been used.

What is claimed is:

1. An improved electrical energy storage system comprising:
    at least one cell having a relatively positive metal electrode and a relatively negative halogen electrode separated by an aqueous electrolyte containing ions of said metal and halogen,
    means for forming and storing a quantity of halogen hydrate,
    means for circulating said electrolyte to said cell and said means for forming and storing said halogen hydrate,
    throttling means for partially reducing the pressure on the circulating electrolyte while maintaining the pressure in the cell, thereby causing chlorine to be desorbed therefrom; and
    means for separating the desorbed chlorine from the electrolyte under reduced pressure.

2. An improved electrical energy storage system as defined in claim 1 wherein the means for separating the desorbed chlorine comprises a chlorine separation zone in series with means for reducing the pressure therein, said pressure reducing means adapted to remove the desorbed chlorine from said zone; the chlorine-depleted electrolyte effluent being passed from said zone to the means for forming and storing halogen hydrate.

3. An improved electrical energy storage system as defined in claim 1 wherein the cell is maintained under atmospheric pressure.

4. An improved electrical energy storage system as defined in claim 1 wherein upon discharge, the throttling valve and chlorine separation zone are bypassed and the electrolyte emanating from the cell is passed directly to the means for forming and storing halogen hydrate.

5. An improved electrical energy storage system as defined in claim 2 wherein the chlorine separation zone is maintained under a pressure of about one-half atmosphere or less.

6. An improved electrical energy storage system as defined in claim 2 wherein the chlorine separation zone is maintained under a pressure of about one-third atmosphere or less.

7. An improved electrical energy storage system as defined in claim 2 wherein the desorbed chlorine is compressed in said means for reducing the pressure in the chlorine separation zone and at least a portion thereof is passed to the means for forming and storing halogen hydrate.

8. An improved electrical energy storage system as defined in claim 2 wherein the chlorine separation zone contains one or more protruding surfaces therein adapted to aid in the vapor-liquid separation.

* * * * *